United States Patent
Cheng et al.

(10) Patent No.: US 10,090,724 B2
(45) Date of Patent: Oct. 2, 2018

(54) STATOR FOR USE IN A DUAL-PHASED MOTOR AND A METHOD FOR WINDING THE STATOR

(71) Applicant: Sunonwealth Electric Machine Industry Co., Ltd., Kaohsiung (TW)

(72) Inventors: Chung-Ken Cheng, Kaohsiung (TW); I-Fen Hsieh, Kaohsiung (TW); Shit-Chin Wu, Kaohsiung (TW); Sing-Ying Lee, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 468 days.

(21) Appl. No.: 14/814,545

(22) Filed: Jul. 31, 2015

(65) Prior Publication Data
US 2016/0087500 A1    Mar. 24, 2016

(30) Foreign Application Priority Data
Sep. 24, 2014 (TW) .............................. 103133060 A

(51) Int. Cl.
H02K 1/00 (2006.01)
H02K 3/28 (2006.01)
H02K 15/095 (2006.01)

(52) U.S. Cl.
CPC ............. *H02K 3/28* (2013.01); *H02K 15/095* (2013.01)

(58) Field of Classification Search
CPC ............................... H02K 3/28; H02K 15/095
USPC .......................................................... 310/198
See application file for complete search history.

(56) References Cited

U.S. PATENT DOCUMENTS

| | | | |
|---|---|---|---|
| 4,698,537 A * | 10/1987 | Byrne | H02K 1/246 310/168 |
| 7,075,207 B2 | 7/2006 | Lu | |
| 8,203,246 B2 * | 6/2012 | Nashiki | H02K 3/28 310/179 |

FOREIGN PATENT DOCUMENTS

| | | |
|---|---|---|
| CN | 2710237 Y | 7/2005 |
| CN | 203761150 U | 8/2014 |
| JP | 2010045956 A | 2/2010 |
| TW | 201019574 A | 5/2016 |

\* cited by examiner

*Primary Examiner* — Jianchun Qin
(74) *Attorney, Agent, or Firm* — Alan D. Kamrath; Kamrath IP Lawfirm, P.A.

(57) ABSTRACT

A stator for use in a dual-phased motor includes a magnetic yoke portion, a first magnetic pole, a second magnetic pole, a third magnetic pole and a fourth magnetic pole. The first, second, third and fourth magnetic poles are circumferentially arranged around and coupled with the magnetic yoke portion. Each of the first, second, third and fourth magnetic poles is wound with a coil having a first coil layer and a second coil layer. The first coil layer and the second coil layer of each of the first, second, third and fourth magnetic poles are in different phases. In other embodiments, several methods for winding a stator for use in a dual-phased motor are respectively proposed.

20 Claims, 14 Drawing Sheets

STATOR FOR USE IN A DUAL-PHASED MOTOR AND A METHOD FOR WINDING THE STATOR

CROSS REFERENCE TO RELATED APPLICATIONS

The application claims the benefit of Taiwan application serial No. 103133060, filed Sep. 24, 2014, the subject matter of which is incorporated herein by reference.

BACKGROUND OF THE INVENTION

1. Field of the Invention

The present invention generally relates to a stator for use in a dual-phased motor and, more particularly, to a stator for use in a dual-phased motor in which the stator includes a plurality of magnetic poles each being wound with first and second coil layers.

2. Description of the Related Art

FIG. 1 shows a conventional stator 9 for use in a dual-phased motor. The stator 9 includes a first magnetic pole 91, a second magnetic pole 92, a third magnetic pole 93 and a fourth magnetic pole 94 that are circumferentially arranged around and coupled with a magnetic yoke portion 95. The winding of the stator 9 is formed by center tapping. The magnetic poles 91, 92, 93, 94 can be wound with a wire to form a coil 96 on each of the magnetic poles 91, 92, 93, 94. The wire includes two ends connected to a first power pin "O" and a second power pin "I", respectively. The wire also forms a common pin "V" at a center thereof by center tapping. In the arrangement, each coil 96 of the first and third magnetic poles 91, 93 is in a first phase, and each coil 96 of the second and fourth magnetic poles 92, 94 is in a second phase. Accordingly, the stator 9 can be used in a brushless direct current motor in order to drive the rotor of the motor to rotate.

In this structure, the stator 9 can be activated by dual-phased power which includes first-phased power and second-phased power. The first-phased power can be received via the first power pin "O", and the second-phased power can be received via the second power pin "I." The common pin "V" can be connected to ground or can have a reference voltage.

However, the stator 9 still has some disadvantages. For example, surge is easily induced on the coils 96 when the voltage polarities of the first-phased power and the second-phased power change (phase commutation), leading to generation of noise or vibration of the dual-phased motor.

In light of this, it is necessary to provide a novel stator for use in a dual-phased motor and a method for winding the stator. The stator is able to reduce the surge of individual coils when the voltage polarities of the first-phased power and the second-phased power change, thereby advantageously reducing the noise and vibration generated during the operation of the motor and improving its operational stability.

SUMMARY OF THE INVENTION

It is therefore the objective of this invention to provide a stator for use in a dual-phased motor in which the stator includes a plurality of magnetic poles each being wound with a first coil layer and a second coil layer. The first and second coil layers on each magnetic pole are designed to have different phases in order to form a first-phased coil and a second-phased coil on the magnetic pole, thereby reducing the surge that is generated on the first and second coil layers during the phase commutation of first-phased power and second-phased power.

It is another objective of this invention to provide a method for winding a stator of a dual-phased motor. In the method, a first wire is wound around two of four magnetic poles of the stator to form two first coil layers, a second wire is wound around the two of the four magnetic poles of the stator to form two second coil layers and wound around another two of the four magnetic poles to form another two first coil layers, and a third wire is wound around the other two of the four magnetic poles to form another second coil layers. In this arrangement, the first and second coil layers of each magnetic pole are able to have different phases.

In an embodiment, a stator for use in a dual-phased motor comprises a magnetic yoke portion, a first magnetic pole, a second magnetic pole, a third magnetic pole and a fourth magnetic pole. The first, second, third and fourth magnetic poles are circumferentially arranged around and coupled with the magnetic yoke portion. Each of the first, second, third and fourth magnetic poles is wound with a coil having a first coil layer and a second coil layer. The first coil layer and the second coil layer of each of the first, second, third and fourth magnetic poles are in different phases.

In a form shown, the first coil layers of the first, second, third and fourth magnetic poles comprise at least one first-phased coil and at least one second-phased coil, and the second coil layers of the first, second, third and fourth magnetic poles also comprise at least one first-phased coil and at least one second-phased coil.

In the form shown, the first coil layer of each of the first and third magnetic poles is a first-phased coil, the second coil layer of each of the second and fourth magnetic poles is a first-phased coil, the second coil layer of each of the first and third magnetic poles is a second-phased coil, and the first coil layer of each of the second and fourth magnetic poles is a second-phased coil.

In the form shown, the first coil layers of the first and third magnetic poles are formed by a first wire, the second coil layers of the first and third magnetic poles and the first coil layers of the second and fourth magnetic poles are formed by a second wire, and the second coil layers of the second and fourth magnetic poles are formed by a third wire.

In another form shown, the first coil layer of each of the first and second magnetic poles is a first-phased coil, the second coil layer of each of the third and fourth magnetic poles is a first-phased coil, the second coil layer of each of the first and second magnetic poles is a second-phased coil, and the first coil layer of each of the third and fourth magnetic poles is a second-phased coil.

In the form shown, the first coil layers of the first and second magnetic poles are formed by a first wire, the second coil layers of the first and second magnetic poles and the first coil layers of the third and fourth magnetic poles are formed by a second wire, and the second coil layers of the third and fourth magnetic poles are formed by a third wire.

In the form shown, the stator further comprises a common pin, a connection pin, a first power pin and a second power pin. The first wire has two ends respectively connected to the common pin and the connection pin, the second wire has two ends respectively connected to the second power pin and the common pin, and the third wire has two ends respectively connected to the connection pin and the first power pin.

In the form shown, the first coil layers of the first, second, third and fourth magnetic poles are first-phased coils, and the second coil layers of the first, second, third and fourth magnetic poles are second-phased coils.

In the form shown, the stator further comprises a common pin, a first power pin and a second power pin. The first coil layers of the first, second, third and fourth magnetic poles are formed by a first wire, and the second coil layers of the first, second, third and fourth magnetic poles are formed by a second wire. The first wire has two ends respectively connected to the common pin and the first power pin, and the second wire has two ends respectively connected to the second power pin and the common pin.

In the form shown, the first coil layer of each of the first, second, third and fourth magnetic poles is an inner layer of the coil, and the second coil layer of each of the first, second, third and fourth magnetic poles is an outer layer of the coil that is axially wound around the first coil layer.

In the form shown, each of the first, second, third and fourth magnetic poles is divided into two winding areas radially spaced from each other for the winding purposes of the first coil layer and the second coil layer.

In the form shown, each of the first, second, third and fourth magnetic poles comprises a partition that divides the magnetic pole into the two winding areas.

In the form shown, the stator further comprises a plurality of magnetic poles in addition to the first, second, third and fourth magnetic poles, and a total number of the plurality of magnetic poles and the first, second, third and fourth magnetic poles is even.

In the form shown, the coils of the first and third magnetic poles are wound in a first direction, and the coils of the second and fourth magnetic poles are wound in a second direction opposite to the first direction.

In the form shown, the windings of the first and second coil layers have a same number of turns.

In the form shown, a number of the first, second, third and fourth magnetic poles having the first coil layer being the first-phased coil is the same as a number of the first, second, third and fourth magnetic poles having the first coil layer being the second-phased coil, and a number of the first, second, third and fourth magnetic poles having the second coil layer being the first-phased coil is the same as a number of the first, second, third and fourth magnetic poles having the second coil layer being the second-phased coil.

In another embodiment, a method for winding a stator for use in a dual-phased motor is disclosed. The stator comprises first, second, third and fourth magnetic poles that are circumferentially arranged around and coupled with a magnetic yoke portion. The method comprises winding a first wire around the first and third magnetic poles to form first coil layers; winding a second wire around the first magnetic pole to form a second coil layer, around the second magnetic pole to form another first coil layer, around the third magnetic pole to form another second coil layer, and around the fourth magnetic pole to form further first coil layer; and winding a third wire around the second and fourth magnetic poles to form further second coil layers.

In still another embodiment, a method for winding a stator for use in a dual-phased motor is disclosed. The stator comprises first, second, third and fourth magnetic poles that are circumferentially arranged around and coupled with a magnetic yoke portion. The method comprises winding a first wire around the first and second magnetic poles to form first coil layers; winding a second wire around the first magnetic pole to form a second coil layer, around the second magnetic pole to form another second coil layer, around the third magnetic pole to form another first coil layer, and around the fourth magnetic pole to form further first coil layer; and winding a third wire around the third and fourth magnetic poles to form further second coil layers.

In a form shown, the method further comprises connecting two ends of the first wire to a common pin and a connection pin, respectively; connecting two ends of the second wire to a second power pin and the common pin, respectively; and connecting two ends of the third wire to the connection pin and a first power pin.

In a further embodiment, a method for winding a stator for use in a dual-phased motor is disclosed. The stator comprises first, second, third and fourth magnetic poles that are circumferentially arranged around and coupled with a magnetic yoke portion. The method comprises winding a first wire around the first, second, third and fourth magnetic poles to form first coil layers; connecting two ends of the first wire to a common pin and a first power pin respectively; winding a second wire around the first, second, third and fourth magnetic poles to form second coil layers; and connecting two ends of the second wire to a second power pin and the common pin, respectively.

In the form shown, the method further comprises dividing each of the first, second, third and fourth magnetic poles into two winding areas radially spaced from each other, and winding the first coil layer and the second coil layer in the two winding areas, respectively.

In the form shown, the first and second coil layers of the first and third magnetic poles are wound in a direction, and the first and second coil layers of the second and fourth magnetic poles are wound in another direction opposite to the direction.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
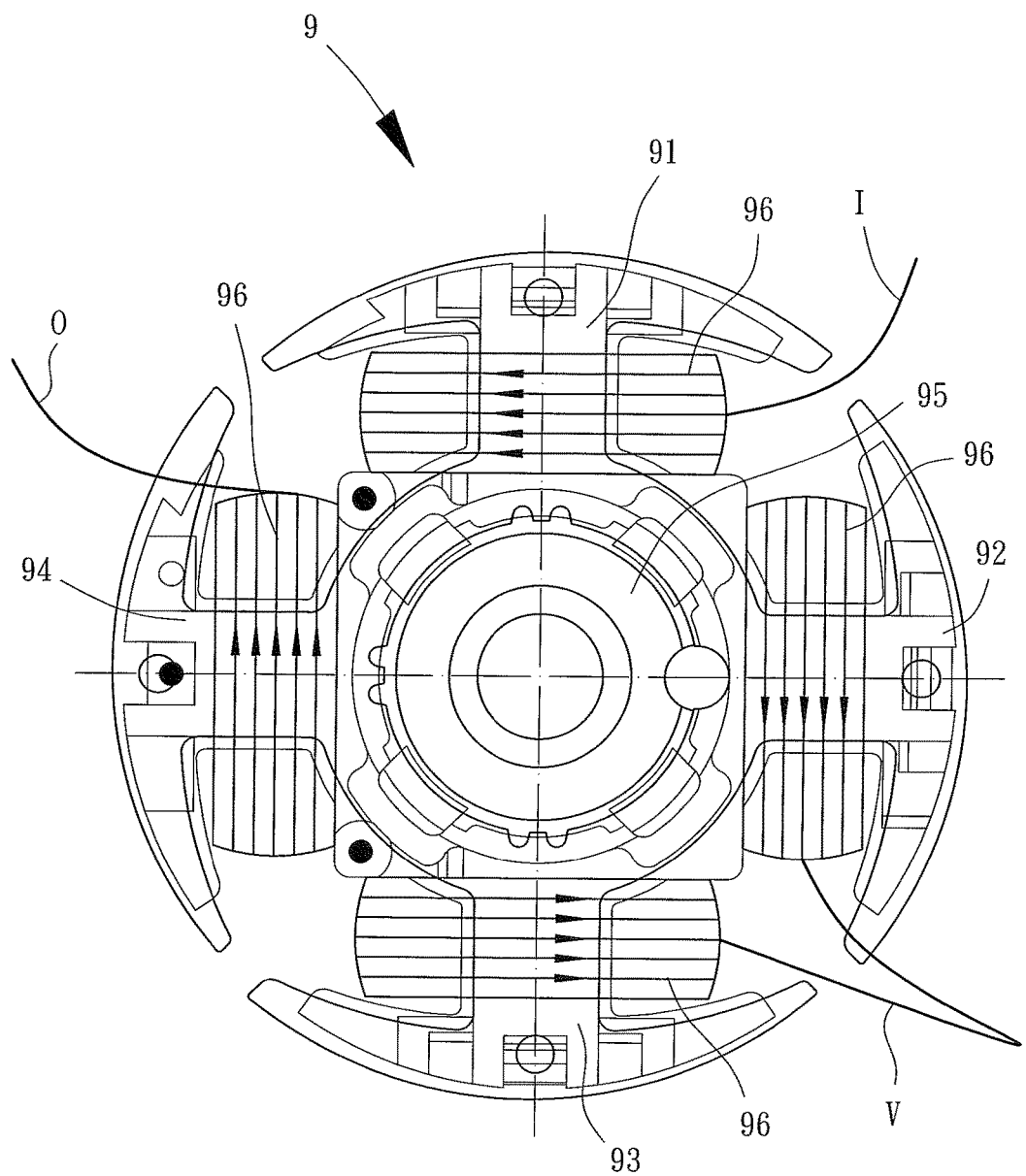
FIG. 1 is a top view of a conventional stator for use in a dual-phased motor.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
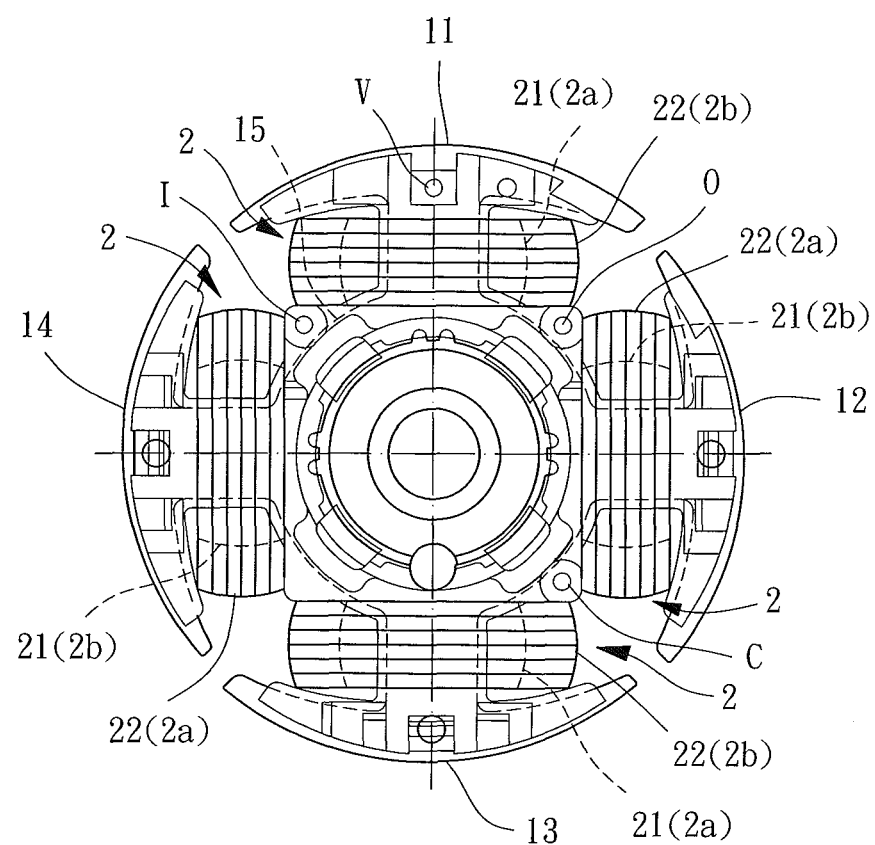
FIG. 2 is a top view of a stator for use in a dual-phased motor according to a first embodiment of the invention.

FIG. 2 shows a stator for use in a dual-phased motor according to a first embodiment of the invention. The stator of the first embodiment can be used to form a brushless direct current motor and includes a plurality of magnetic poles and a magnetic yoke portion 15. The magnetic yoke portion 15 is coupled with at least four magnetic poles. The at least four magnetic poles include a first magnetic pole 11, a second magnetic pole 12, a third magnetic pole 13 and a fourth magnetic pole 14. The magnetic poles 11, 12, 13, 14 are coupled with and circumferentially arranged around the magnetic yoke portion 15. However, the magnetic yoke portion 15 can be coupled with a plurality of magnetic poles having a quantity being a multiple of 2. Namely, the stator for use in a dual-phased motor can have 4, 6, 8, 10 or 12 poles. The stator for use in a dual-phased motor in the first embodiment can be used in an inner-rotor-type motor or an outer-rotor-type motor. In this embodiment, the stator is used in an outer-rotor-type motor in which the magnetic poles 11, 12, 13, 14 are circumferentially arranged around and coupled with an outer periphery of the magnetic yoke portion 15. In another case where the stator is used in an inner-rotor-type motor, the magnetic poles 11, 12, 13, 14 would be coupled with an inner periphery of the magnetic yoke portion 15, as it can be readily appreciated by one skilled in the art.

Each of the magnetic poles 11, 12, 13, 14 is wound with a coil 2 having a first coil layer 21 and a second coil layer 22. The windings of first and second coil layers 21, 22 can have the same number of turns. Specifically, the first coil layer 21 is wound around an outer periphery of first magnetic pole 11, and the second coil layer 22 is then wound on the first coil layer 21. As such, the first coil layer 21 is an inner layer of the coil 2, and the second coil layer 22 is an outer coil layer of the coil 2. Similar to the first magnetic pole 11, each of the second, third and fourth magnetic poles 12, 13, 14 is wound with first and second coil layers 21, 22. The first coil layer 21 on each magnetic pole is always an inner layer of the coil 2, and the second coil layer 22 on each magnetic pole is always an outer layer of the coil 2. Furthermore, as stated above, the second coil layer 22 is wound around first coil layer 21. Therefore, the first and second coil layers 21, 22 form a double-layered coil structure. However, the first and second coil layers 21, 22 have different phases.

Among the first coil layers 21 of the magnetic poles 11, 12, 13, 14, said first coil layers 21 include at least one first-phased coil 2a and at least one second-phased coil 2b. Similarly, among the second coil layers 22 of the magnetic poles 11, 12, 13, 14, said second coil layers 22 also include at least one first-phased coil 2a and at least one second-phased coil 2b. In other words, there is at least one first-phased coil 2a and at least one second-phased coil 2b out of the first coil layers 21, and there is also at least one first-phased coil 2a and at least one second-phased coil 2b out of the second coil layers 22.

Among the first, second, third and fourth magnetic poles 11, 12, 13, 14, the number of the magnetic pole(s) having the first coil layer 21 being the first-phased coil 2a may be the same as the number of the magnetic pole(s) having the first coil layer 21 being the second-phased coil 2b, and the number of the magnetic pole(s) having the second coil layer 22 being the first-phased coil 2a may be the same as the number of the magnetic pole(s) having the second coil layer 22 being the second-phased coil 2b. In other words, the first coil layers 21 of the magnetic poles 11, 12, 13, 14 may include the same number of first-phased coils 2a and second-phased coils 2b, and the second coil layers 22 of the magnetic poles 11, 12, 13, 14 may also include the same number of first-phased coils 2a and second-phased coils 2b.

For example, the first coil layers 21 of the first and third magnetic poles 11, 13 in the embodiment are first-phased coils 2a, and the second coil layers 22 of the second and fourth magnetic poles 12, 14 are first-phased coils 2a. As such, the second coil layers 22 of the first and third magnetic poles 11, 13 are second-phased coils 2b, and the first coil layers 21 of the second and fourth magnetic poles 12, 14 are second-phased coils 2b. In this manner, the first and second coil layers 21, 22 on each magnetic pole are in different phases. Thus, each of the magnetic poles 11, 12, 13, 14 includes the first-phased coils 2a and the second-phased coils 2b. In this regard, the first coil layers 21 of all of the magnetic poles 11, 12, 13, 14 include two first-phased coils 2a and two second-phased coils 2b, and the second coil layers 22 of all of the magnetic poles 11, 12, 13, 14 also include two first-phased coils 2a and two second-phased coils 2b.

Figure 3:
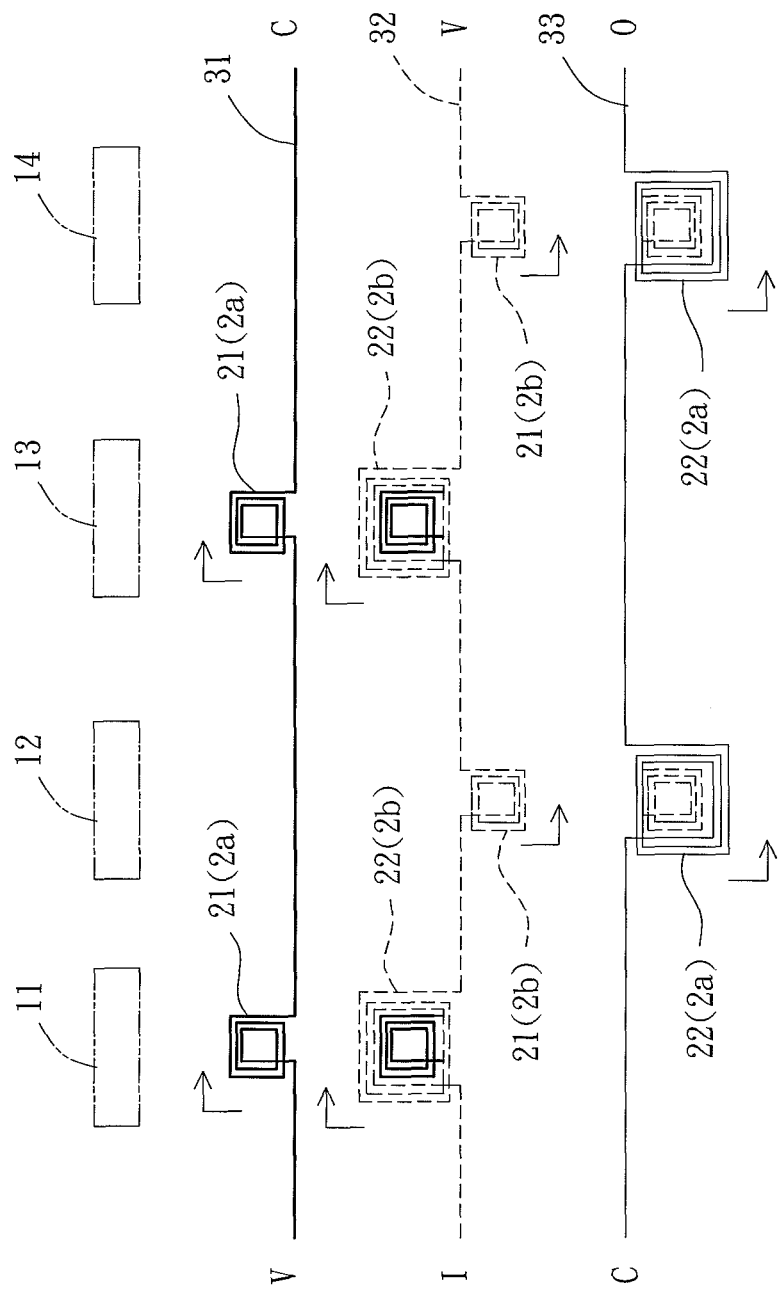
FIG. 3 shows the winding mechanisms of the stator of the first embodiment of the invention.

Specifically, FIG. 3 shows a winding mechanism of the stator for use in a dual-phased motor in the first embodiment of the invention. The first coil layers 21 of the first and third magnetic poles 11, 13 are formed by winding a first wire 31 around said magnetic poles 11, 13. The second coil layers 22 of the first and third magnetic poles 11, 13 and the first coil layers 21 of the second and fourth magnetic poles 12, 14 are formed by winding a second wire 32 around said magnetic poles 11, 12, 13, 14. In addition, the second coil layers 22 of the second and fourth magnetic poles 12, 14 are formed by winding a third wire 33 around said magnetic poles 12, 14. In this regard, please also refer to FIG. 2, the stator for use in a dual-phased motor may include a common pin "V", a connection pin "C", a first power pin "O" and a second power pin "I." Two ends of the first wire 31 are connected to the common pin "V" and the connection pin "C", respectively. Two ends of the second wire 32 are connected to the second power pin "I" and the common pin "V", respectively. In addition, two ends of the third wire 33 are connected to the connection pin "C" and the first power pin "O", respectively.

The stator for use in a dual-phased motor may receive dual-phased power which includes first-phased power and second-phased power. Since the first-phased power may be received between the first power pin "O" and the common pin "V", the first-phased power is able to generate an electric current between the first power pin "O" and the common pin "V." The electric current flows on the third wire 33 and flows through the second coil layers 22 of the second and fourth magnetic poles 12, 14. The electric current can be guided to the first wire 31 via the connection pin "C", so that the electric current is able to flow through the first coil layers 21 of the first and third magnetic poles 11, 13. Thus, the first coil layers 21 of the first and third magnetic poles 11, 13 and the second coil layers 22 of the second and fourth magnetic poles 12, 14 are first-phased coils 2a.

Similarly, since the second-phased power may be received between the second power pin "I" and the common pin "V", the second-phased power is able to generate an electric current between the second power pin "I" and the common pin "V." The electric current flows on the second wire 32 and flows through the second coil layer 22 of the first magnetic pole 11, the first coil layer 21 of the second magnetic pole 12, the second coil layer 22 of the third magnetic pole 13 and the first coil layer 21 of the fourth magnetic pole 14. Thus, the second coil layer 22 of the first magnetic pole 11, the first coil layer 21 of the second magnetic pole 12, the second coil layer 22 of the third magnetic pole 13 and the first coil layer 21 of the fourth magnetic pole 14 are second-phased coils 2b.

Generally, a bobbin may be coupled with and fitted around an outer periphery of the magnetic yoke portion 15. In this regard, the common pin "V", the connection pin "C", the second power pin "I" and the first power pin "O" can be arranged on the bobbin. The structure and arrangement of the bobbin is not described herein as it can be readily appreciated by one having ordinary skill in the art.

The method for winding the stator for use in a dual-phased motor in the first embodiment of the invention is elaborated as follows.

Figure 4:
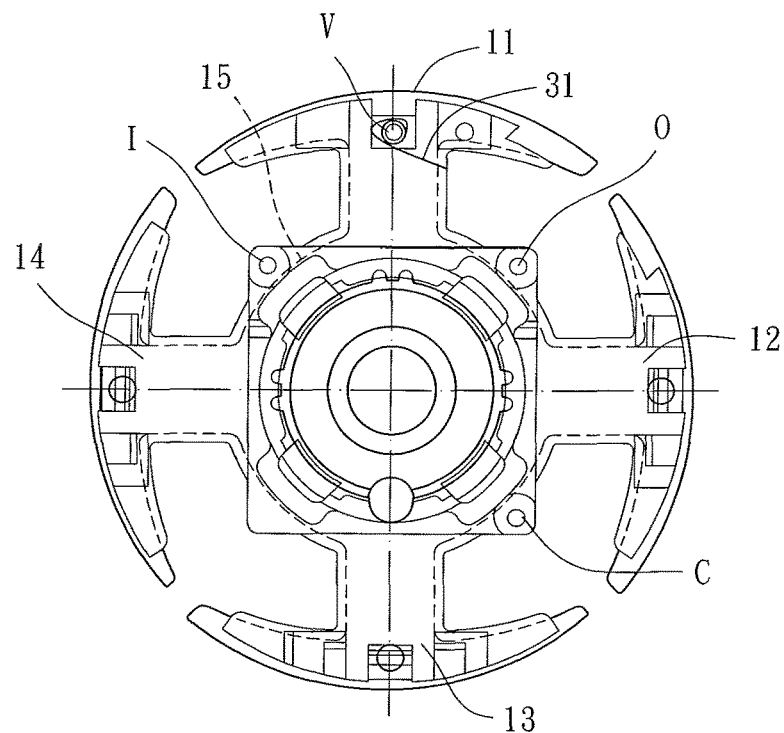
FIG. 4 is a top view of the stator of the first embodiment where the winding process starts with a first wire.
Figure 5:
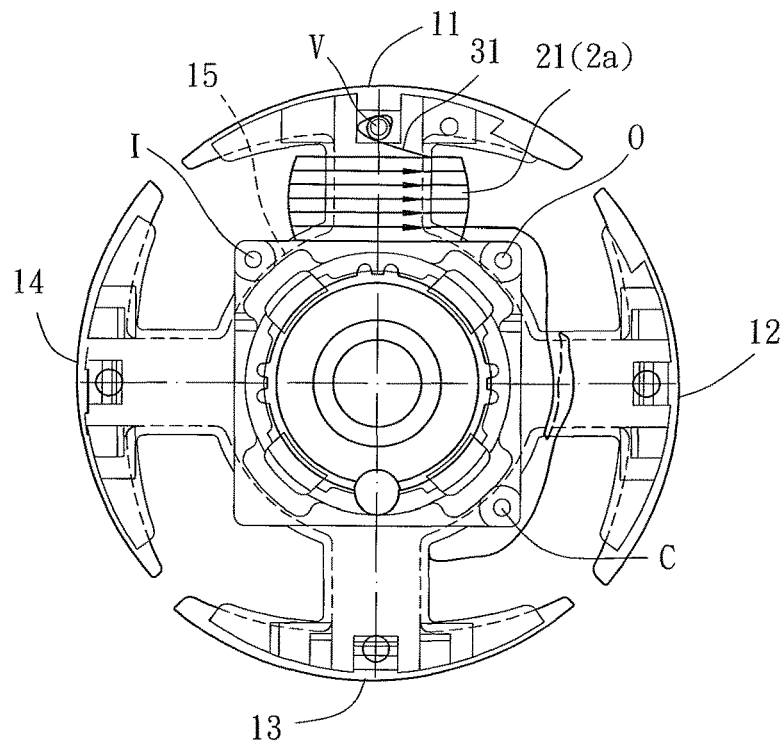
FIG. 5 is the top view of the stator of the first embodiment where the first wire is being wound around a first magnetic pole of the stator to form a first coil layer.
Figure 6:
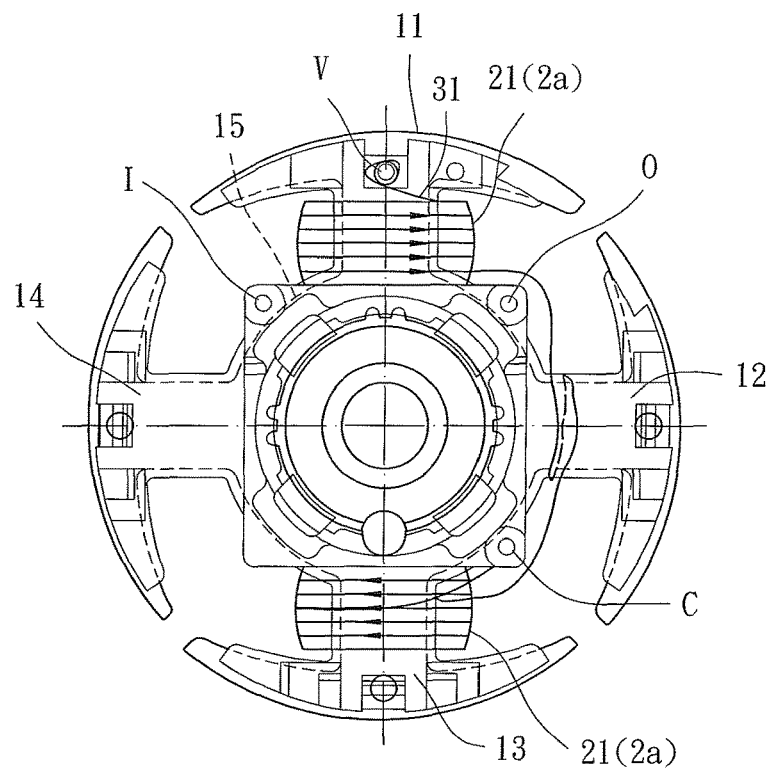
FIG. 6 is the top view of the stator of the first embodiment where the first wire is being wound around a third magnetic pole of the stator to form another first coil layer.
Figure 7:
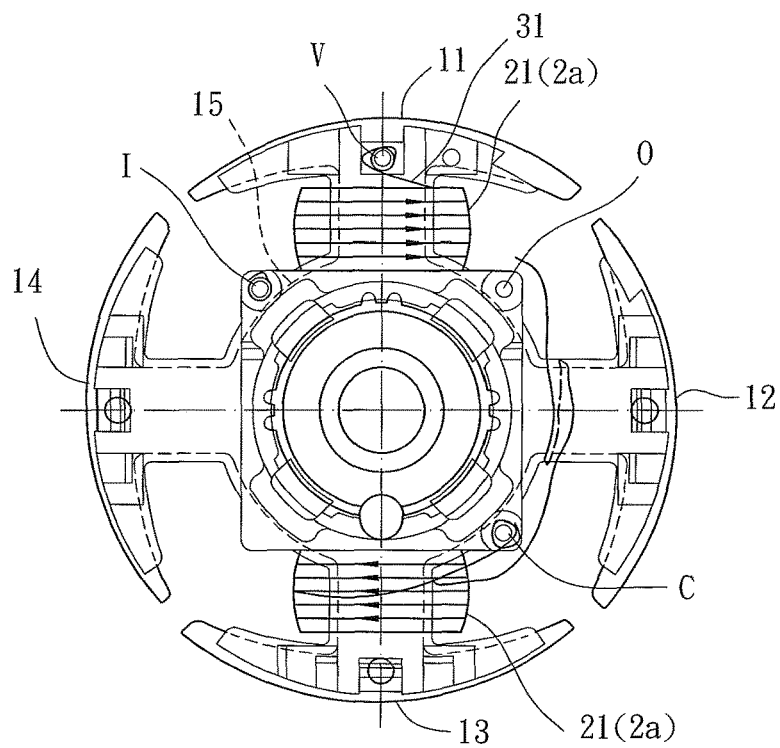
FIG. 7 is the top view of the stator of the first embodiment where the winding operation of the first wire is completed.

Referring to FIG. 4, the winding operation of the first wire 31 is performed first. One end of the first wire 31 is connected to a common pin "V." Referring to FIG. 5, the first wire 31 is wound around the first magnetic pole 11 to form a first coil layer 21. Referring to FIG. 6, the first wire 31 is also wound around the third magnetic pole 13 to form a first coil layer 21. Referring to FIG. 7, another end of the first wire 31 is connected to a connection pin "C" as a final step of the winding operation of the first wire 31. In other words, two ends of the first wire 31 may be connected to the common pin "V" and the connection pin "C", respectively. In one aspect, the two ends of the first wire 31 may also be respectively soldered to the common pin "V" and the connection pin "C" to electrically connect the first wire 31 to the common pin "V" and the connection pin "C", as it can be readily appreciated by the skilled person.

Although the winding operation of the first wire 31 starts at common pin "V" and finishes at connection pin "C" in FIGS. 4-7, the winding operation of the first wire 31 may also start at connection pin "C", wound around the third magnetic pole 13 and the first magnetic pole 11 to form a first coil layer 21 on each of the first and third magnetic poles 11, 13, and finally connected to the common pin "V." As such, the winding operation of the first wire 31 is performed by winding the first wire 31 around the first and third magnetic poles 11, 13 to form a first coil layer 21 on each of the first and third magnetic poles 11, 13 and connecting two ends of the first wire 31 to the common pin "V" and the connection pin "C", respectively.

Figure 8:
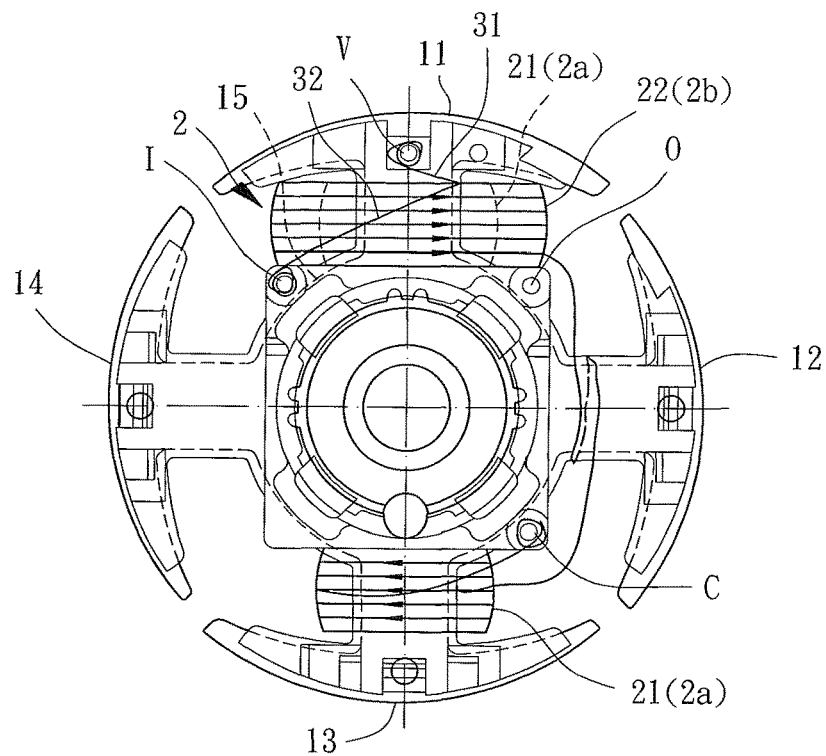
FIG. 8 is the top view of the stator of the first embodiment where the first magnetic pole of the stator is wound with a second coil layer.
Figure 9:
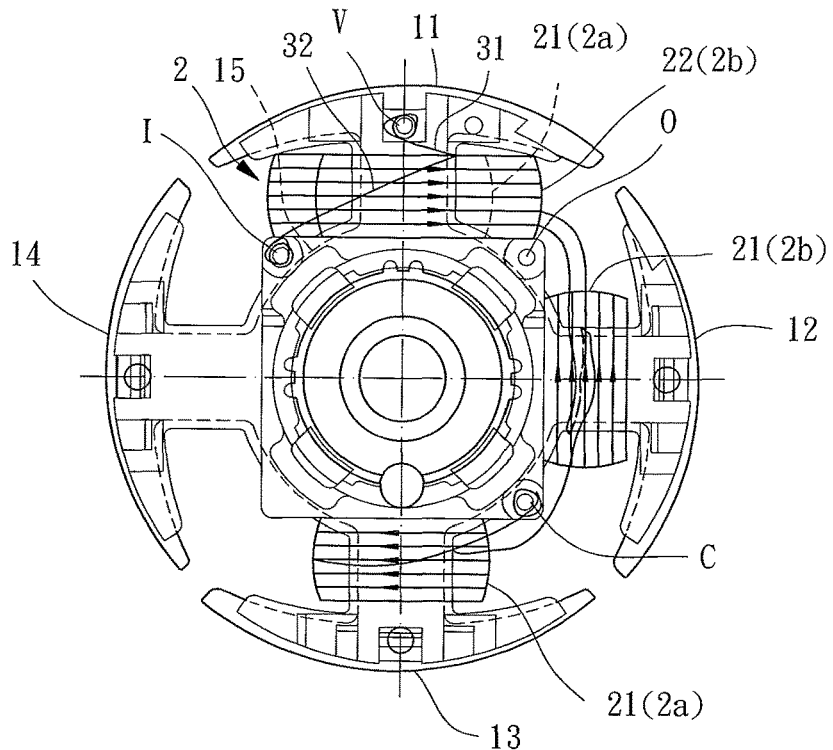
FIG. 9 is the top view of the stator of the first embodiment where a second magnetic pole of the stator is wound with a first coil layer.
Figure 10:
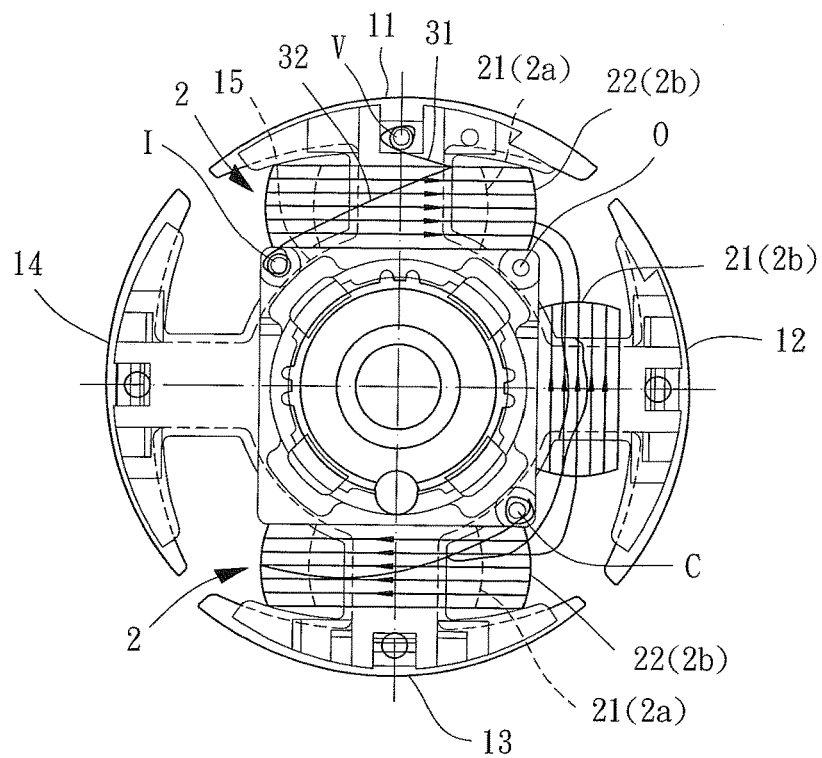
FIG. 10 is the top view of the stator of the first embodiment where a third magnetic pole of the stator is wound with a second coil layer.
Figure 11:
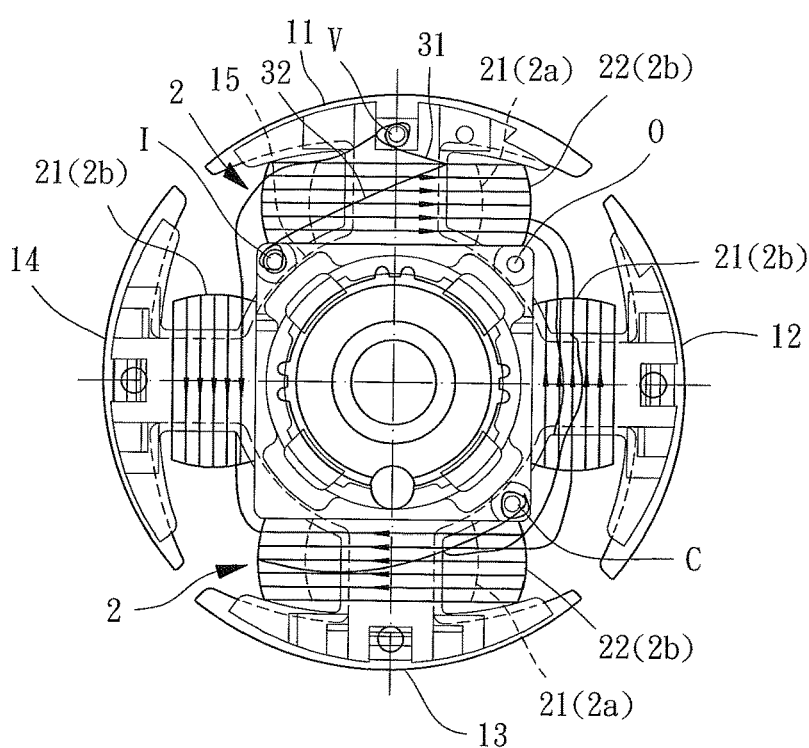
FIG. 11 is the top view of the stator of the first embodiment where a fourth magnetic pole of the stator is wound with a first coil layer.

Referring to FIG. 8, the winding operation of the second wire 32 is then performed. One end of the second wire 32 is connected to a second power pin "I", and the second wire 32 is wound around the first coil layer 21 of the first magnetic pole 11 to form a second coil layer 22. Referring to FIG. 9, the second wire 32 is wound around the second magnetic pole 12 to form a first coil layer 21. Referring to FIG. 10, the second wire 32 is then wound around the first coil layer 21 of the third magnetic pole 13 to form a second coil layer 22. Referring to FIG. 11, the second wire 32 is wound around the fourth magnetic pole 14 to form a first coil layer 21, and another end of the second wire 32 is connected to the common pin "V." Thus, the two ends of the second wire 32 are connected to the second power pin "I" and the common pin "V", respectively. In one aspect, the two ends of the second wire 32 may also be respectively soldered to the second power pin "I" and the common pin "V" to electrically connect the second wire 32 to the second power pin "I" and the common pin "V", as it can be readily appreciated by the skilled person.

Similar to the first wire 31, the sequence of the winding procedures of the second wire 32 is not limited to the above. In other words, the winding operation of the second wire 32 may start at the common pin "V" and finish at the second power pin "I." As such, the winding operation of the second wire 32 is performed by winding the second wire 32 around the first coil layer 21 of the first magnetic pole 11 to form a second coil layer 22, winding the second wire 32 around the second magnetic pole 12 to form a first coil layer 21, winding the second wire 32 around the first coil layer 21 of the third magnetic pole 13 to form a second coil layer 22, winding the second wire 32 around the fourth magnetic pole 14 to form a first coil layer 21, and connecting the second wire 32 to the second power pin "I" and the common pin "V" respectively.

Figure 12:
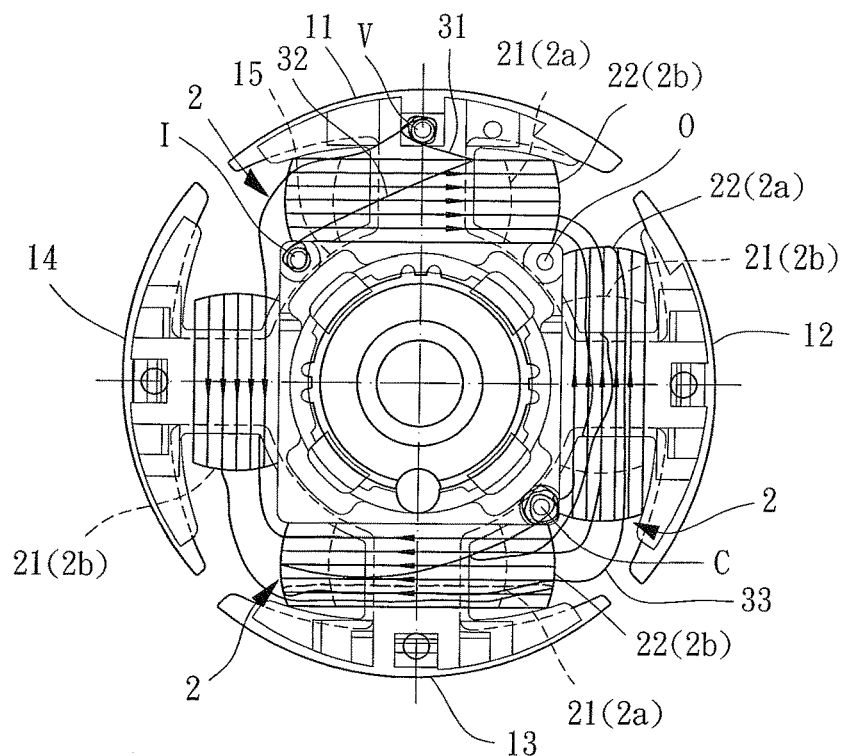
FIG. 12 is the top view of the stator of the first embodiment where the second magnetic pole of the stator is wound with a second coil layer.
Figure 13:
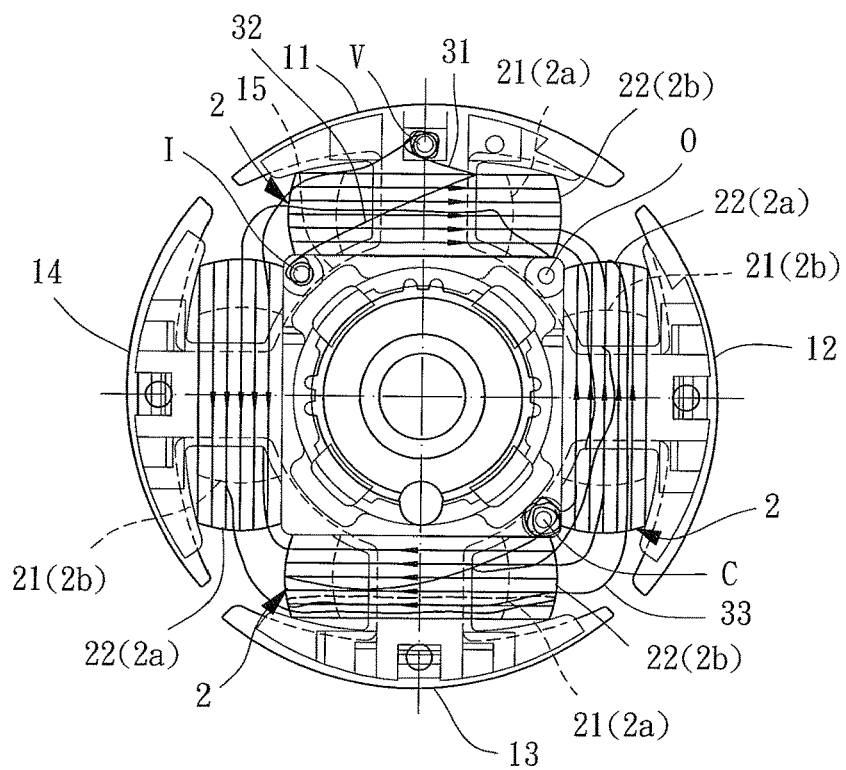
FIG. 13 is the top view of the stator of the first embodiment where a fourth magnetic pole of the stator is wound with a second coil layer.
Figure 14:
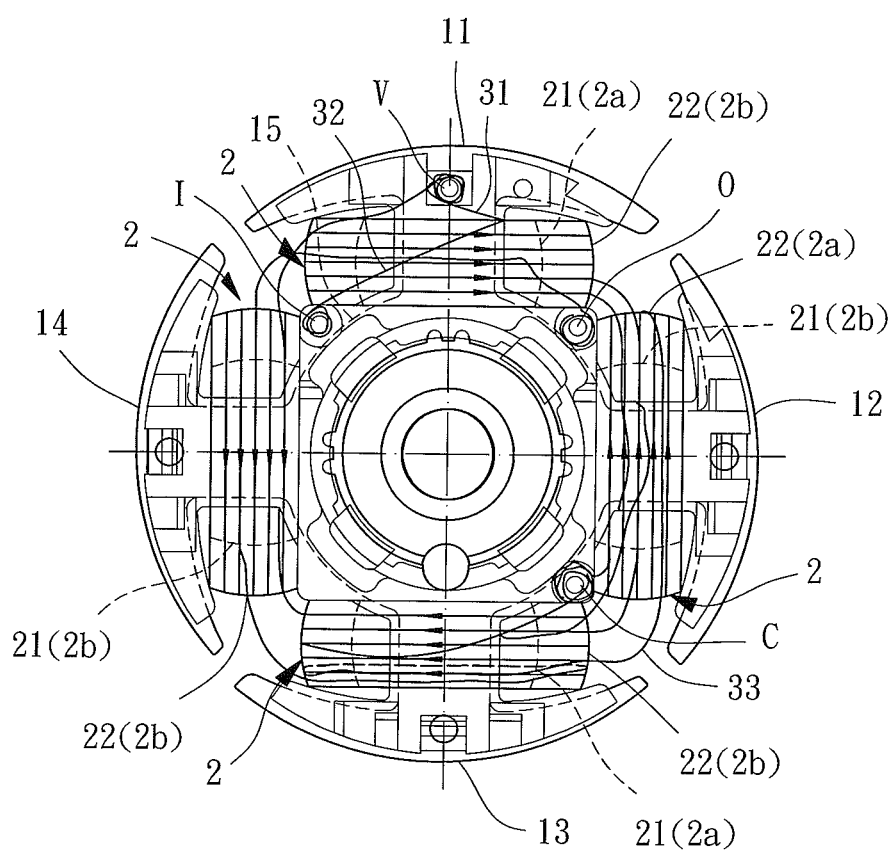
FIG. 14 is the top view of the stator of the first embodiment where the winding operations of all of the wires are completed.

Referring to FIG. 12, the winding operation of a third wire 33 is performed last. One end of the third wire 33 is connected to the connection pin "C", and the third wire 33 is wound around the first coil layer 21 of the second magnetic pole 12 to form a second coil layer 22. Referring to FIG. 13, the third wire 33 is then wound around the first coil layer 21 of the fourth magnetic pole 14 to form a second coil layer 22. Referring to FIG. 14, another end of the third wire 33 is connected to a first power pin "O" as a final step of the winding operation of the third wire 33. Thus, the two ends of the third wire 33 are connected to the connection pin "C" and the first power pin "O", respectively. In one aspect, the two ends of the third wire 33 may also be respectively soldered to the connection pin "C" and the first power pin "O" to electrically connect the third wire 33 to the connection pin "C" and the first power pin "O", as it can be readily appreciated by the skilled person.

Similar to the first wire 31 and the second wire 32, the sequence of the winding procedures of the third wire 33 is not limited to the above. In other words, the winding operation of the third wire 33 may start at the first power pin "O" and finish at the connection pin "C." As such, the winding operation of the third wire 33 is performed by winding the third wire 33 around the first coil layer 21 of the second magnetic pole 12 to form a second coil layer 22, winding the third wire 33 around the first coil layer 21 of the fourth magnetic pole 14 to form a second coil layer 22, and connecting the third wire 33 to the connection pin "C" and the first power pin "O" respectively.

Referring to FIGS. 2 and 14 also, after the winding operations of the first, second and third wires 31, 32 and 33 are finished, the first coil layers 21 of the first and third magnetic poles 11 and 13 and the second coil layers 22 of the second and fourth magnetic poles 12 and 14 may form first-phased coils 2a, and the second coil layers 22 of the first and third magnetic poles 11 and 13 and the first coil layers 21 of the second and fourth magnetic poles 12 and 14 may form second-phased coils 2b. Thus, the winding operations of the stator for use in a dual-phased motor in the first embodiment are completed.

As stated above, the dual-phased motor of the first embodiment may be activated by dual-phased power having first-phased power and second-phased power. The first-phased power may be fed between the first power pin "O" and the common pin "V", and the second-phased power may be fed between the second power pin "I" and the common pin "V." The first-phased power may generate an electric current between the first power pin "O" and the common pin "V" in which the electric current flows through the first-phased coils 2a formed by the first coil layers 21 of the first and third magnetic poles 11 and 13 and the second coil layers 22 of the second and fourth magnetic poles 12 and 14. Similarly, the second-phased power may generate an electric current between the second power pin "I" and the common pin "V" in which the electric current flows through the second-phased coils 2b formed by the second coil layer 22 of the first magnetic pole 11, the first coil layer 21 of the second magnetic pole 12, the second coil layer 22 of the third magnetic pole 13 and the first coil layer 21 of the fourth magnetic pole 14.

Figure 15A:
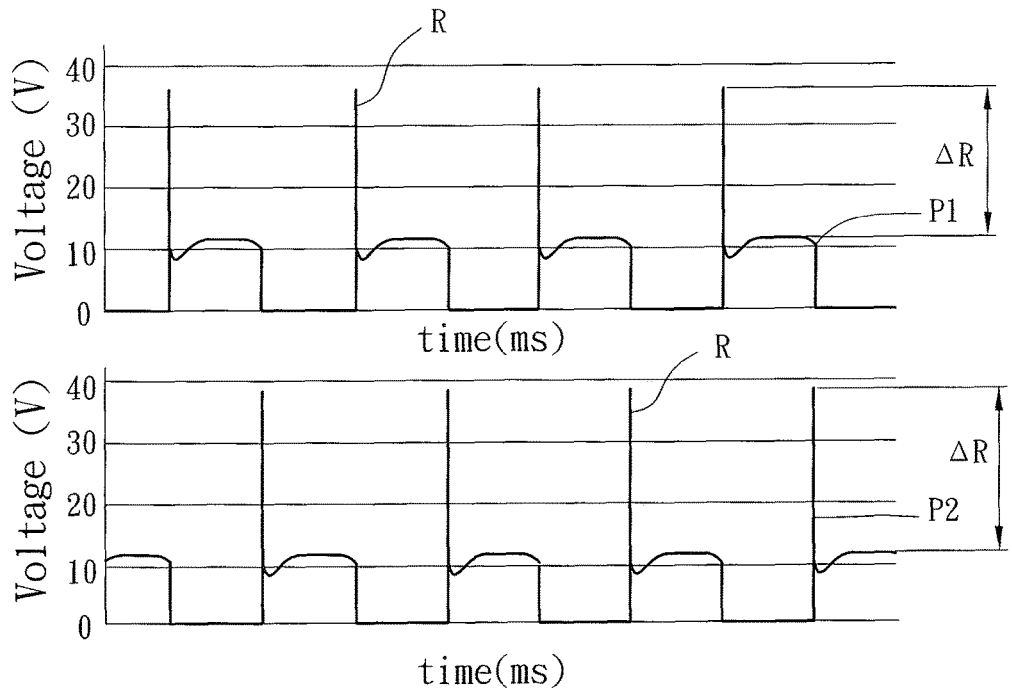
FIG. 15a shows a voltage diagram measured from the coils of the conventional stator of FIG. 1.

Referring to FIG. 15a which shows a voltage diagram measured from the coil 96 of the stator 9 when the dual-phased power is fed into a brushless direct current (BLDC) motor using the conventional stator 9. In FIG. 15a, the first signal "P1" represents the voltage diagram of the coil 96 when the first-phased power of the dual-phased power is fed into the coil 96, and the second signal "P2" represents the voltage diagram of the coil 96 when the second-phased power of the dual-phased power is fed into the coil 96. It can be observed from the first signal "P1" and the second signal "P2" that a surge "R" tends to occur on the coil 96 during the change of the voltage polarity of the first-phased power and the second-phased power (phase commutation). The magnitude difference "ΔR" between the surge "R" and the first signal "P1" and the second signal "P2" is approximately 20 volts.

Figure 15B:
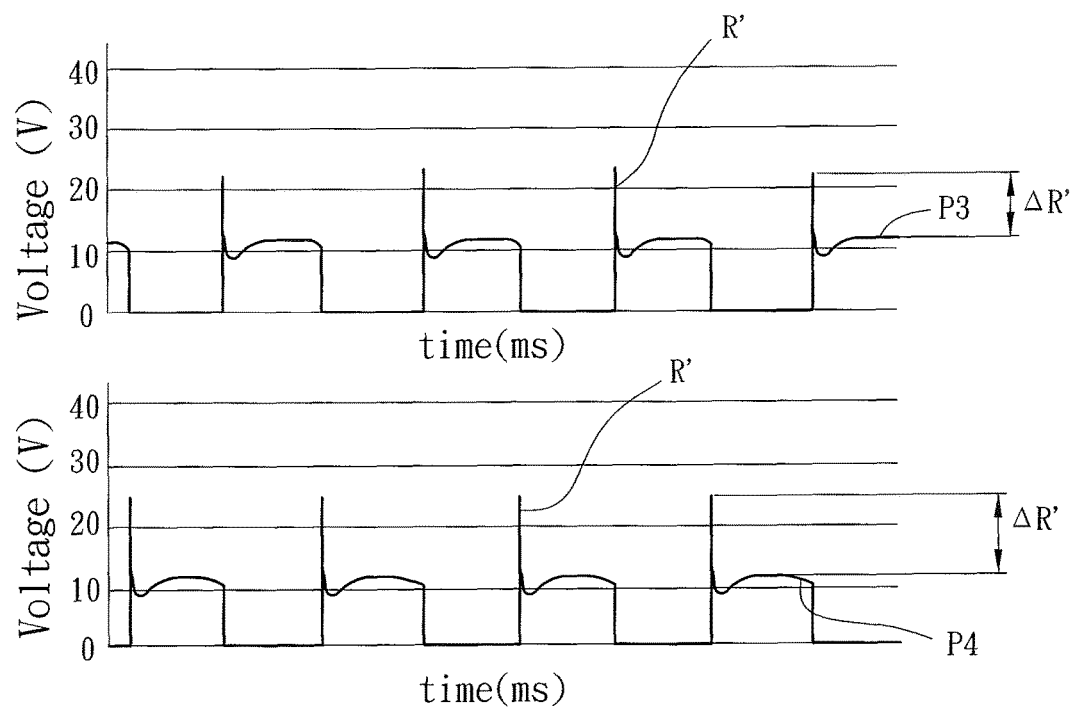
FIG. 15b shows a voltage diagram measured from the first and second coil layers of the stator of the first embodiment of the invention.

Referring to FIG. 15b which shows a voltage diagram measured from the coil 2 when said dual-phased power is fed into a BLDC motor using the stator of the first embodiment. In FIG. 15b, the third signal "P3" represents the voltage diagram of the first power pin "O" when the first-phased power of said dual-phased power is fed into the first power pin "O", and the fourth signal "P4" represents the voltage diagram of the second power pin "I" when the second-phased power of the dual-phased power is fed into the second power pin "I." The third signal "P3" can be retrieved from each first-phased coil 2a, and the fourth signal "P4" can be retrieved from each second-phased coil 2b, as it can be readily appreciated by the skilled person. It can be observed from the third signal "P3" and the fourth signal "P4" that a surge R' tends to occur on the coil 2 during the change of the voltage polarity of the first-phased power and the second-phased power (phase commutation). The magnitude difference ΔR' between the surge R' and the third signal "P3" and the fourth signal "P4" is approximately 10 volts. According to the comparison, it is proven that the stator for use in a dual-phased motor as disclosed by the invention is able to effectively reduce the surge of the coil 2 generated during the phase commutation of the first-phased power and the second-phased power.

Figure 16:
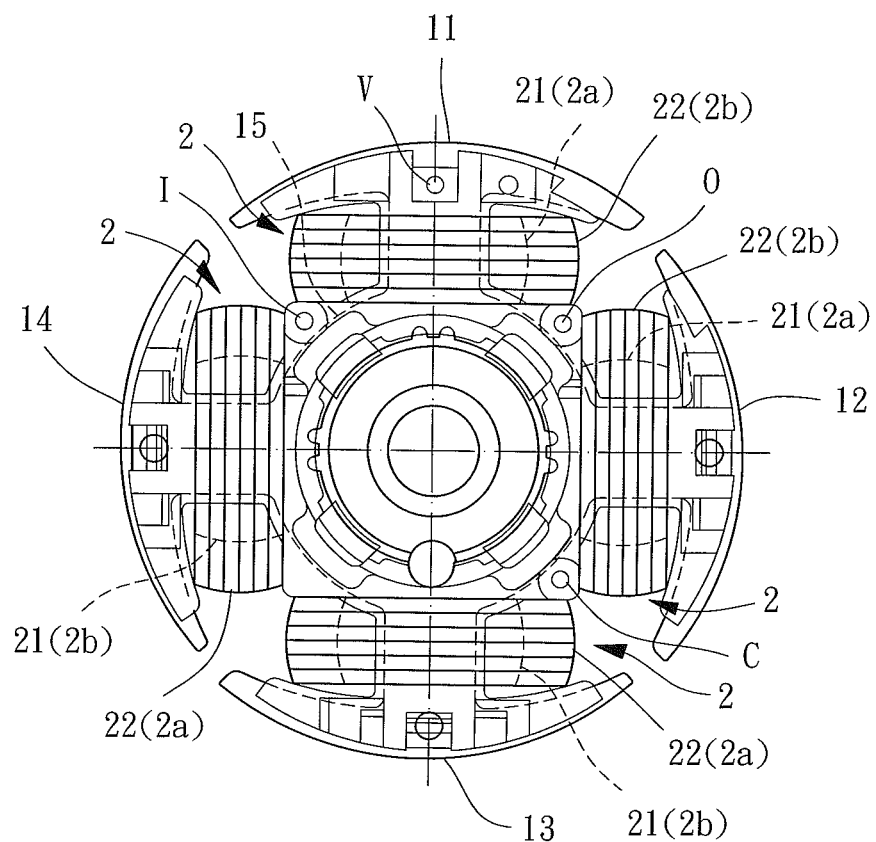
FIG. 16 is a top view of a stator for use in a dual-phased motor according to a second embodiment of the invention.

Referring to FIG. 16, a stator for use in a dual-phased motor is shown according to a second embodiment of the invention. The stator also comprises a magnetic yoke portion 15 that couples with a first magnetic pole 11, a second magnetic pole 12, a third magnetic pole 13 and a fourth magnetic pole 14. The stator in the second embodiment differs from that in the first embodiment in that the first coil layers 21 on the first and second magnetic poles 11 and 12 and the second coil layers 22 on the third and fourth magnetic poles 13 and 14 are first-phased coils 2a. In this regard, the second coil layers 22 on the first and second magnetic poles 11 and 12 and the first coil layers 21 on the third and fourth magnetic poles 13 and 14 are second-phased coils 2b. In this embodiment, the first coil layer 21 on each of the magnetic poles is an inner layer of the coil 2, and the second coil layer 22 on each of the magnetic poles is an outer layer of the coil 2. The second coil layer 22 is wound around the first coil layer 21 along an axial direction of the magnetic yoke portion 15. In this manner, the first and second coil layers 21 and 22 are able to form a double-layered coil structure.

Figure 17:
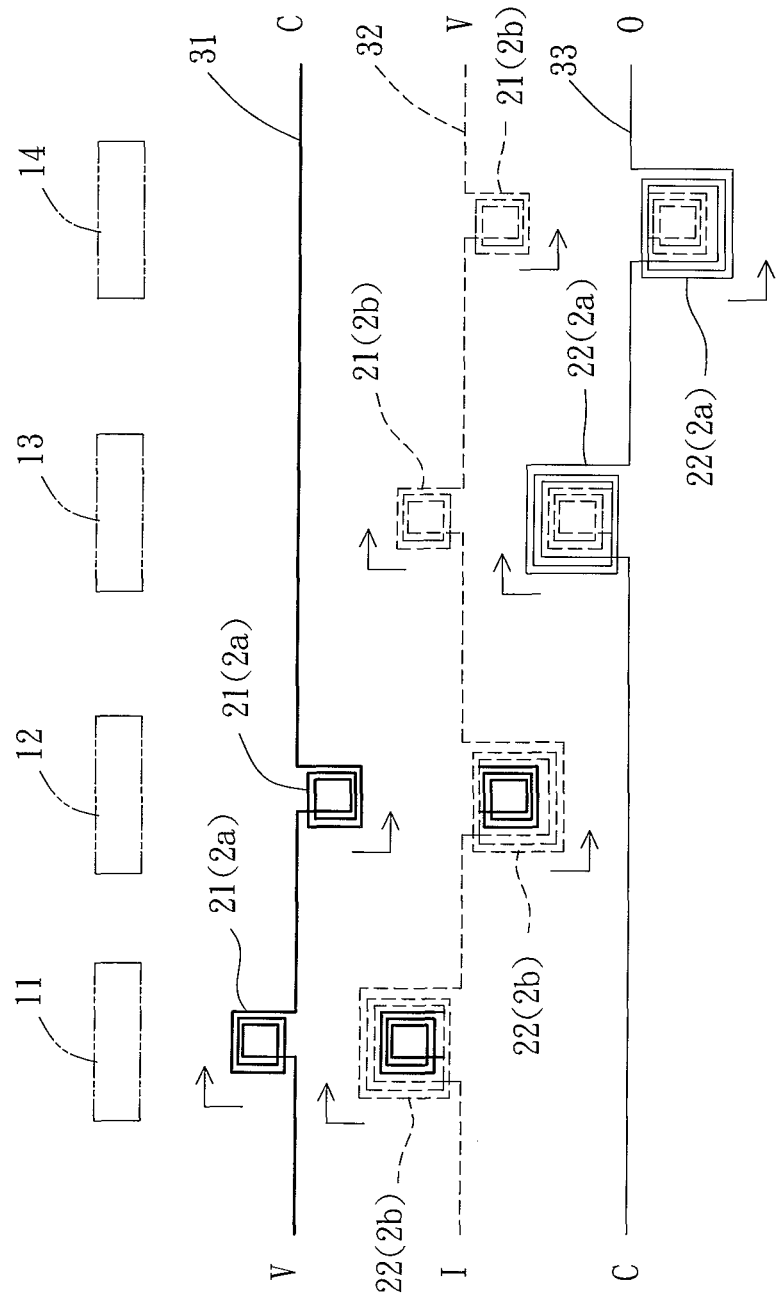
FIG. 17 shows the winding mechanisms of the stator of the second embodiment of the invention.

Specifically, referring to FIG. 17, a winding mechanism of the stator of the second embodiment of the invention is shown. The first coil layers 21 on the first and second magnetic poles 11 and 12 may be formed by a first wire 31, the second coil layers 22 on the first and second magnetic poles 11 and 12 and the first coil layers 21 on the third and fourth magnetic poles 13 and 14 may be formed by a second wire 32, and the second coil layers 22 on the third and fourth magnetic poles 13 and 14 may be formed by a third wire 33. Also referring to FIG. 16, the stator of the dual-phased motor may have a common pin "V", a connection pin "C", a first power pin "O" and a second power pin "I." Two ends of the first wire 31 are connected to the common pin "V" and the connection pin "C", respectively. Two ends of the second wire 32 are connected to the second power pin "I" and the common pin "V", respectively. Two ends of the third wire 33 are connected to the connection pin "C" and the first power pin "O", respectively.

Since first-phased power can be fed between the first power pin "O" and the common pin "V", the first-phased power is able to generate an electric current between the first power pin "O" and the common pin "V." The electric current flows through the second coil layers 22 of the fourth and third magnetic poles 14 and 13 along the third wire 33. The electric current then flows to the first wire 31 via the connection pin "C" and flows through the first coil layers 21 of the second and first magnetic poles 12 and 11. Therefore, the first coil layers 21 of the first and second magnetic poles 11 and 12 and the second coil layers 22 of the third and fourth magnetic poles 13 and 14 are first-phased coils 2a.

Similarly, the second-phased power may be fed into the second power pin "I" and the common pin "V." Therefore, the second-phased power may generate an electric current on the second power pin "I" and the common pin "V." The electric current flows through the second coil layers 22 of the first and second magnetic poles 11 and 12 and the first coil layers 21 of the third and fourth magnetic poles 13 and 14 along the second wire 32. Therefore, the second coil layers 22 of the first and second magnetic poles 11 and 12 and the first coil layers 21 of the third and fourth magnetic poles 13 and 14 are second-phased coils 2b.

The method for winding the stator of the second embodiment is similar to the method for winding the stator of the first embodiment. The method for winding the stator of the second embodiment also includes the winding operations of the first, second and third wires 31, 32 and 33. The winding operation of the first wire 31 is performed by winding the first wire 31 around the first and second magnetic poles 11 and 12 to form first coil layers 21 and connecting two ends of the first wire 31 to the common pin "V" and the connection pin "C." The winding operation of the second wire 32 is performed by winding the second wire 32 around the first coil layer 21 of the first magnetic pole 11 to form a second coil layer 22, winding the second wire 32 around the first coil layer 21 of the second magnetic pole 12 to form another second coil layer 22, winding the second wire 32 around the third magnetic pole 13 to form a first coil layer 21, winding the second wire 32 around the fourth magnetic pole 14 to form another first coil layer 21, and connecting two ends of the second wire 32 to the second power pin "I" and the common pin "V." The winding operation of the third wire 33 is performed by winding the third wire 33 around the first coil layers 21 of the third and fourth magnetic poles 13, 14 to form second coil layers 22 and connecting the two ends of the third wire 33 to the connection pin "C" and the first power pin "O."

It can be known from the above that, in the stator of the second embodiment, the first coil layer 21 and the second coil layer 22 on each of the magnetic poles are able to have different phases by forming the first coil layers 21 of the first and second magnetic poles 11, 12 and the second coil layers 22 of the third and fourth magnetic poles 13, 14 as first-phased coils 2a as well as forming the second coil layers 22 of the first and second magnetic poles 11, 12 and the first coil layers 21 of the third and fourth magnetic poles 13, 14 as second-phased coils 2b.

Figure 18:
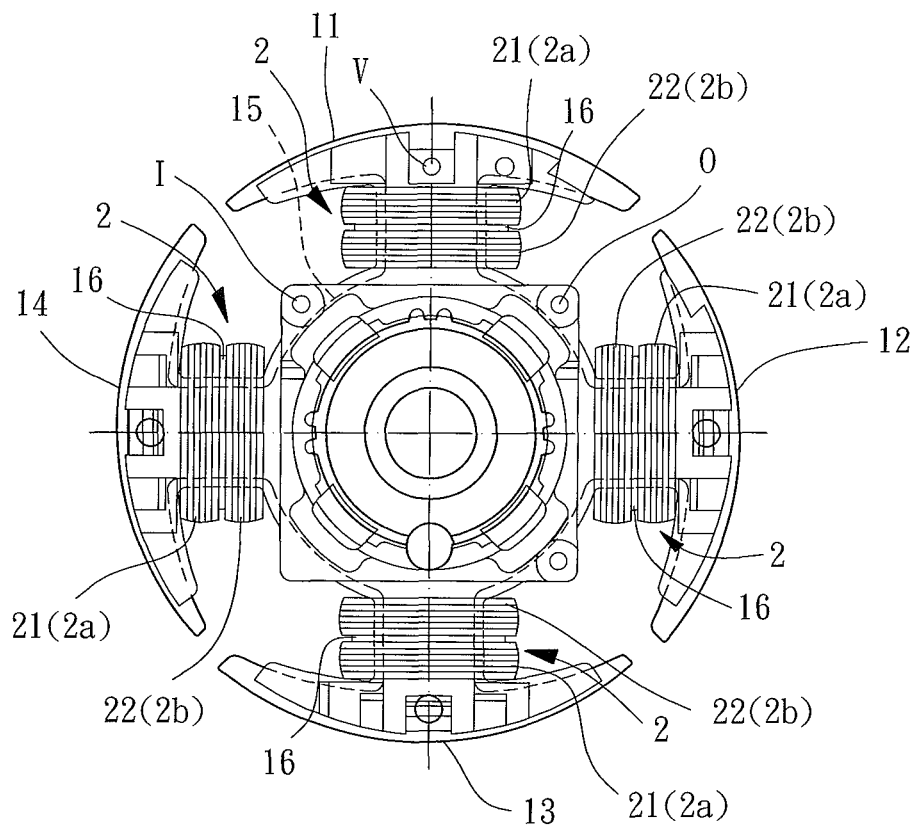
FIG. 18 is a top view of a stator for use in a dual-phased motor according to a third embodiment of the invention.

Referring to FIG. 18, a stator for use in a dual-phased motor is shown according to a third embodiment of the invention. Although the second coil layer 22 is wound around the first coil layer 21 to respectively form the first and second coil layers 21, 22 as an inner layer of the coil 2 and an outer layer of the coil 2 in the first and second embodiments, the first coil layer 21 and the second coil layer 22 may be separately wound around each of the first, second, third and fourth magnetic poles 11, 12, 13, 14 in the third embodiment. Specifically, as an example of the first magnetic pole 11, the first coil layer 21 and the second coil layer 22 are wound around the first magnetic pole 11 in a manner that the first coil layer 21 is arranged on the portion of the first magnetic pole 11 relatively distant to the magnetic yoke portion 15 and the second coil layer 22 is arranged on the portion of the first magnetic pole 11 relatively adjacent to the magnetic yoke portion 15. In this arrangement, the first coil layer 21 and the second coil layer 22 may be separately wound around the first magnetic pole 11 without forming the double-layered coil structure in the first and second embodiments. As such, the magnetic pole may be divided into two winding areas along a radial direction for winding purposes of the first coil layer 21 and the second coil layer 22.

Figure 19:
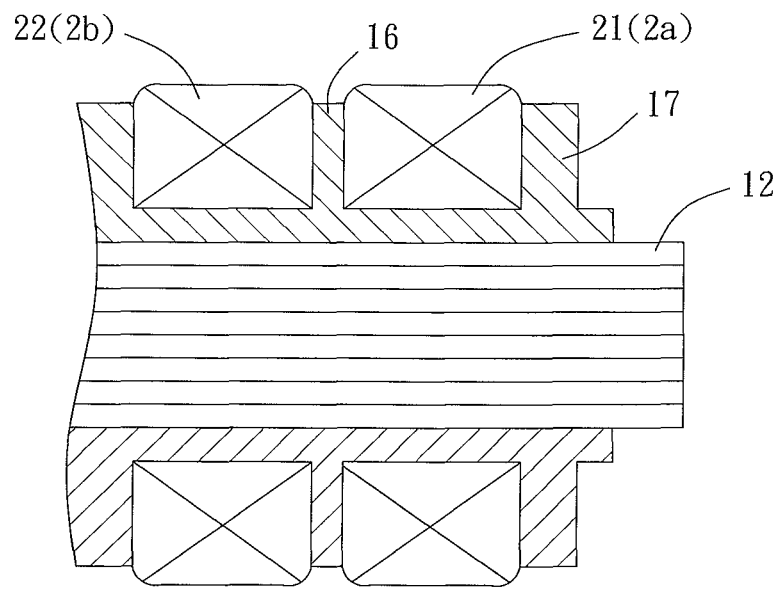
FIG. 19 is a partially-enlarged, cross sectional view of the stator of the third embodiment of the invention.

More specifically, each of the first, second, third and fourth magnetic poles 11, 12, 13, 14 may be provided with a partition 16. The partition 16 may be coupled to the outer periphery of the magnetic pole. Alternatively, each of the first, second, third and fourth magnetic poles 11, 12, 13, 14 may be provided with a winding bobbin 17 on which the partition 16 is formed. The partition 16 may be formed on the winding bobbin 17 in an integral manner or may be an independent component that is attached to the winding bobbin 17. As an example of the second magnetic pole 12, FIG. 19 shows a partially-enlarged, cross sectional view of the second magnetic pole 12 with the partition 16 provided to divide the space of the winding bobbin 17 into two winding areas for winding the first coil layer 21 and the second coil layer 22, respectively. Therefore, the partition 16 is able to prevent the first coil layer 21 and the second coil layer 22 from coming into contact with each other during the winding operations thereof. Advantageously, the winding operation of the stator of the third embodiment is convenient. However, the structure and arrangement of the winding bobbin 17 is not described herein as it can be readily appreciated by the skilled person.

Besides, although both the first coil layer 21 and the second coil layer 22 include at least one first-phased coil 2a and at least one second-phased coil 2b in the first and second embodiments, each of the first coil layer 21 is a first-phased coil 2a, and each of the second coil layer 22 is a second-phased coil 2b in the third embodiment. Accordingly, the stator of the third embodiment is able to effectively reduce the surge of the coils 2 during the phase commutation of the first-phased power and the second-phased power.

Figure 20:
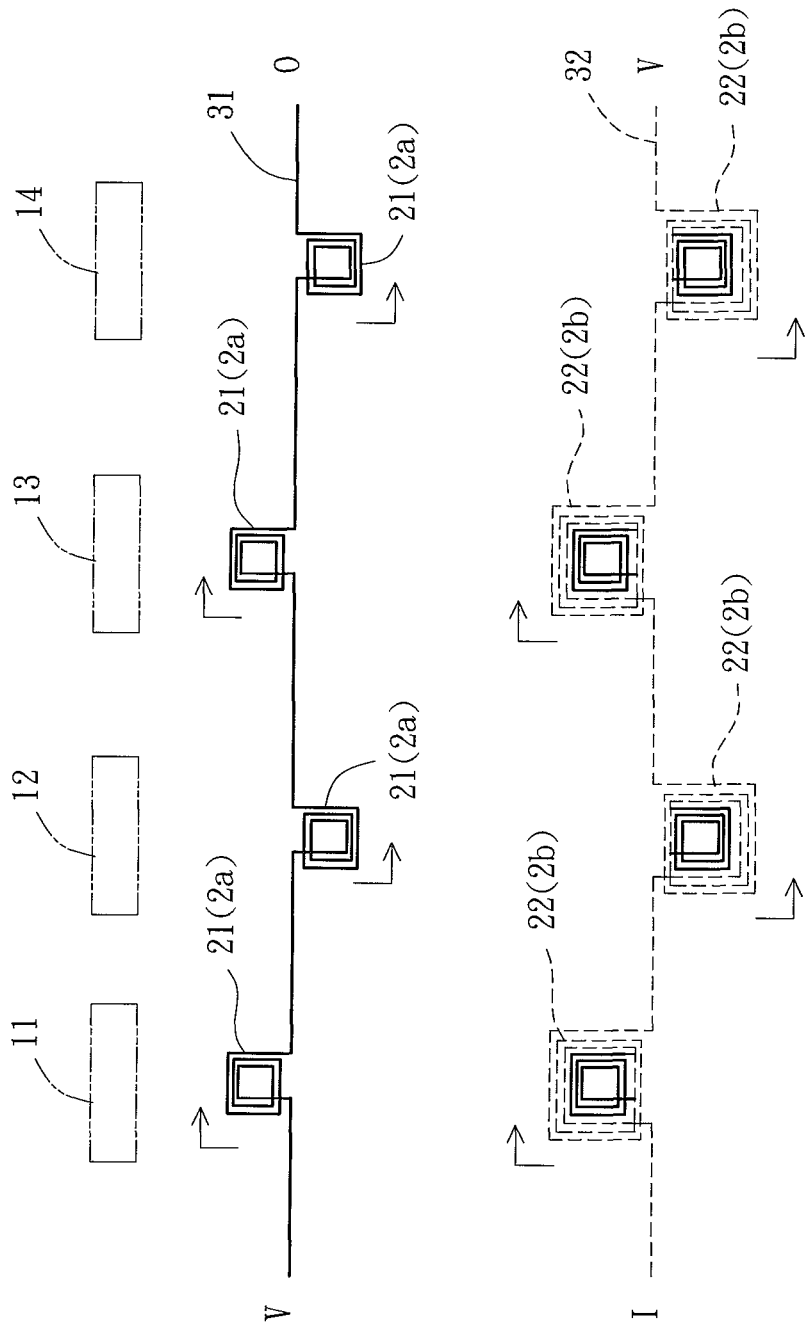
FIG. 20 shows the winding mechanisms of the stator of the third embodiment of the invention.

More specifically, FIG. 20 shows a winding mechanism of the stator of the third embodiment of the invention. A first wire 31 may be wound around the first, second, third and fourth magnetic poles 11, 12, 13, 14 to form four first coil layers 21, and a second wire 32 may be wound around the first, second, third and fourth magnetic poles 11, 12, 13, 14 to form four second coil layers 22. The stator of the third embodiment may include a common pin "V", a first power pin "O" and a second power pin "I." Two ends of the first wire 31 are connected between the common pin "V" and the first power pin "O", and two ends of the second wire 32 are connected between the second power pin "I" and the common pin "V."

Since first-phased power may be fed between the first power pin "O" and the common pin "V", the first-phased power is able to generate an electric current between the first power pin "O" and the common pin "V." The electric current flows through the first coil layers 21 of the first, second, third and fourth magnetic poles 11, 12, 13, 14. Thus, the first coil layers 21 of the first, second, third and fourth magnetic poles 11, 12, 13, 14 are first-phased coils 2a.

Similarly, since second-phased power may be fed between the second power pin "I" and the common pin "V", the second-phased power is able to generate an electric current between the second power pin "I" and the common pin "V." The electric current flows through the second coil layers 22 of the first, second, third and fourth magnetic poles 11, 12, 13, 14. Thus, the second coil layers 22 of the first, second, third and fourth magnetic poles 11, 12, 13, 14 are second-phased coils 2b.

The method for winding the stator of the third embodiment includes the winding operations of the first wire 31 and the second wire 32. The winding operation of the first wire 31 is performed by winding the first wire 31 around the first, second, third and fourth magnetic poles 11, 12, 13, 14 to form a first coil layer 21 on each of said magnetic poles 11, 12, 13, 14 and connecting the two ends of the first wire 31 to the common pin "V" and the first power pin "O", respectively. The winding operation of the second wire 32 is performed by winding the second wire 32 around the first, second, third and fourth magnetic poles 11, 12, 13, 14 to form a second coil layer 22 on each of said magnetic poles 11, 12, 13, 14 and connecting the two ends of the second wire 32 to the second power pin "I" and the common pin "V", respectively.

It can be known from the above that, in the stator of the third embodiment, the first coil layer 21 and the second coil layer 22 on each of the magnetic poles 11, 12, 13, 14 are able to have different phases by forming the first coil layers 21 of the first, second, third and fourth magnetic poles 11, 12, 13, 14 as first-phased coils 2a as well as forming the second coil layers 22 of the first, second, third and fourth magnetic poles 11, 12, 13, 14 as second-phased coils 2b.

Referring to FIGS. 3, 17 and 20, it may be noted that the coils 2 are wound around the first and third magnetic poles 11, 13 in a first direction in the methods for winding the stators of the first, second and third embodiments. In this regard, the coils 2 are wound around the second and fourth magnetic poles 12, 14 in a second direction opposite to the first direction. Specifically, one first coil layer 21 and one second coil layer 22 are wound around the first magnetic pole 11 in the first direction between the magnetic yoke portion 15 and an end face of the first magnetic pole 11, and the other first coil layer 21 and second coil layer 22 are wound around the second magnetic pole 12 in the second direction between the magnetic yoke portion 15 and an end face of the second magnetic pole 12. If the first direction is a clockwise direction, the second direction may be a counterclockwise direction, as it can be readily appreciated by the skilled person.

Therefore, in the stator of any of the first, second and third embodiments, if the coil 2 on one magnetic pole is wound in the first direction, the coil 2 on an adjacent magnetic pole (magnetic poles 11 and 12 are adjacent, the magnetic poles 12 and 13 are adjacent . . . etc) will be wound in the second direction. Accordingly, the stator will be able to receive the dual-phased power for activation and operation.

Moreover, as discussed previously, the magnetic yoke portion 15 can be coupled with a plurality of magnetic poles having a quantity being a multiple of 2. Although the stator in each of the above embodiments is shown to have four magnetic poles, the stator may also include a fifth magnetic pole and a sixth magnetic pole in addition to the first, second, third and fourth magnetic poles. The winding mechanisms of the fifth and sixth magnetic poles may be the same as those of the first and second magnetic poles. Thus, the stator can also be a six-pole stator.

Similarly, as another example, the stator in the invention may also include a fifth magnetic pole, a sixth magnetic pole, a seventh magnetic pole and an eighth magnetic pole in addition to the first, second, third and fourth magnetic poles. In this regard, the winding mechanisms of the fifth, sixth, seventh and eighth magnetic poles may be the same as those of the first, second, third and fourth magnetic poles. Therefore, the stator can also be an eight-pole stator. In other words, according to the stators and their winding processes discussed above, one having ordinary skill in the art would readily appreciate the winding mechanisms of any extra magnetic poles in addition to the discussed first, second, third and fourth magnetic poles 11, 12, 13, 13. Thus, the stator can have four, six, eight, ten, twelve or more poles.

It can be concluded from the above that each magnetic pole of the stator in the first, second and third embodiments can have a first-phased coil 2a and a second-phased coil 2b by winding the magnetic pole with a first coil layer 21 and a second coil layer 22 and forming the first coil layer 21 and the second coil layer 22 with different phases. An electric current generated by the first-phased power of the dual-phased power may flow through the first-phased coil 2a, and an electric current generated by the second-phased power of the dual-phased power may flow through the second-phased coil 2b. As such, the surge generated on the first coil layer 21 and the second coil layer 22 during the phase commutation of the first-phased power and the second-phased power can be reduced.

Based on this, as compared with the conventional stator 9 (which is formed by center tapping) where the surge is easily induced on the coil 96 during the change of the voltage polarities of the first-phased power and the second-phased power (phase commutation), the stator in each embodiment of the invention is able to reduce the surge generated on the first coil layer 21 and the second coil layer 22 during the phase commutation of the first-phased power and the second-phased power by winding each magnetic pole with the first coil layer 21 and the second coil layer 22 and forming the first coil layer 21 and the second coil layer 22 with different phases. Advantageously, noise and vibration of the dual-phased motor using the stator can be reduced.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A stator for use in a dual-phased motor, comprising:
a magnetic yoke portion; and
first, second, third and fourth magnetic poles that are circumferentially arranged around and coupled with the magnetic yoke portion, wherein each of the first, second, third and fourth magnetic poles is wound with a coil having a first coil layer and a second coil layer, and wherein the first coil layer and the second coil layer of each of the first, second, third and fourth magnetic poles are in different phases,
wherein the first coil layer of each of the first and third magnetic poles is a first-phased coil, wherein the second coil layer of each of the second and fourth magnetic poles is a first-phased coil, wherein the second coil layer of each of the first and third magnetic poles is a second-phased coil, and wherein the first coil layer of each of the second and fourth magnetic poles is a second-phased coil.

2. The stator for use in the dual-phased motor as claimed in claim 1, wherein the first coil layers of the first and third magnetic poles are formed by a first wire, wherein the second coil layers of the first and third magnetic poles and the first coil layers of the second and fourth magnetic poles are formed by a second wire, and wherein the second coil layers of the second and fourth magnetic poles are formed by a third wire.

3. The stator for use in the dual-phased motor as claimed in claim 2, further comprising a common pin, a connection pin, a first power pin and a second power pin, wherein the first wire has two ends respectively connected to the common pin and the connection pin, wherein the second wire has two ends respectively connected to the second power pin and the common pin, and wherein the third wire has two ends respectively connected to the connection pin and the first power pin.

4. The stator for use in the dual-phased motor as claimed in claim 1, wherein the first coil layer of each of the first, second, third and fourth magnetic poles is an inner layer of the coil, and wherein the second coil layer of each of the first, second, third and fourth magnetic poles is an outer layer of the coil that is axially wound around the first coil layer.

5. The stator for use in the dual-phased motor as claimed in claim 1, wherein each of the first, second, third and fourth magnetic poles is divided into two winding areas radially spaced from each other for the winding purposes of the first coil layer and the second coil layer.

6. The stator for use in the dual-phased motor as claimed in claim 5, wherein each of the first, second, third and fourth magnetic poles comprises a partition that divides the magnetic pole into the two winding areas.

7. The stator for use in the dual-phased motor as claimed in claim 1, further comprising a plurality of magnetic poles in addition to the first, second, third and fourth magnetic poles, wherein a total number of the plurality of magnetic poles and the first, second, third and fourth magnetic poles is even.

8. The stator for use in the dual-phased motor as claimed in claim 1, wherein the coils of the first and third magnetic poles are wound in a first direction, and wherein the coils of the second and fourth magnetic poles are wound in a second direction opposite to the first direction.

9. The stator for use in the dual-phased motor as claimed in claim 1, wherein windings of the first and second coil layers have a same number of turns.

10. The stator for use in the dual-phased motor as claimed in claim 1, wherein a number of the first, second, third and fourth magnetic poles having the first coil layer being the first-phased coil is the same as a number of the first, second, third and fourth magnetic poles having the first coil layer being the second-phased coil, and wherein a number of the first, second, third and fourth magnetic poles having the second coil layer being the first-phased coil is the same as a number of the first, second, third and fourth magnetic poles having the second coil layer being the second-phased coil.

11. A stator for use in a dual-phased motor, comprising:
a magnetic yoke portion; and
first, second, third and fourth magnetic poles that are circumferentially arranged around and coupled with the magnetic yoke portion, wherein each of the first, second, third and fourth magnetic poles is wound with a coil having a first coil layer and a second coil layer, and wherein the first coil layer and the second coil layer of each of the first, second, third and fourth magnetic poles are in different phases,
wherein the first coil layer of each of the first and second magnetic poles is a first-phased coil, wherein the second coil layer of each of the third and fourth magnetic poles is a first-phased coil, wherein the second coil layer of each of the first and second magnetic poles is a second-phased coil, and wherein the first coil layer of each of the third and fourth magnetic poles is a second-phased coil.

12. The stator for use in the dual-phased motor as claimed in claim 11, wherein the first coil layers of the first and second magnetic poles are formed by a first wire, wherein the second coil layers of the first and second magnetic poles and the first coil layers of the third and fourth magnetic poles are formed by a second wire, and wherein the second coil layers of the third and fourth magnetic poles are formed by a third wire.

13. The stator for use in the dual-phased motor as claimed in claim 11, wherein the first coil layer of each of the first, second, third and fourth magnetic poles is an inner layer of the coil, and wherein the second coil layer of each of the first, second, third and fourth magnetic poles is an outer layer of the coil that is axially wound around the first coil layer.

14. The stator for use in the dual-phased motor as claimed in claim 11, wherein each of the first, second, third and fourth magnetic poles is divided into two winding areas radially spaced from each other for the winding purposes of the first coil layer and the second coil layer.

15. The stator for use in the dual-phased motor as claimed in claim 14, wherein each of the first, second, third and fourth magnetic poles comprises a partition that divides the magnetic pole into the two winding areas.

16. The stator for use in the dual-phased motor as claimed in claim 11, further comprising a plurality of magnetic poles in addition to the first, second, third and fourth magnetic poles, wherein a total number of the plurality of magnetic poles and the first, second, third and fourth magnetic poles is even.

17. The stator for use in the dual-phased motor as claimed in claim 11, wherein the coils of the first and third magnetic poles are wound in a first direction, and wherein the coils of the second and fourth magnetic poles are wound in a second direction opposite to the first direction.

18. The stator for use in the dual-phased motor as claimed in claim 11, wherein windings of the first and second coil layers have a same number of turns.

19. The stator for use in the dual-phased motor as claimed in claim 11, wherein a number of the first, second, third and fourth magnetic poles having the first coil layer being the first-phased coil is the same as a number of the first, second, third and fourth magnetic poles having the first coil layer being the second-phased coil, and wherein a number of the first, second, third and fourth magnetic poles having the second coil layer being the first-phased coil is the same as a number of the first, second, third and fourth magnetic poles having the second coil layer being the second-phased coil.

20. A stator for use in a dual-phased motor, comprising:
a magnetic yoke portion;
first, second, third and fourth magnetic poles that are circumferentially arranged around and coupled with the magnetic yoke portion, wherein each of the first, second, third and fourth magnetic poles is wound with a coil having a first coil layer and a second coil layer, and wherein the first coil layer and the second coil layer of each of the first, second, third and fourth magnetic poles are in different phases,
wherein the first coil layer of each of the first, second, third and fourth magnetic poles is a first-phased coil, and wherein the second coil layer of each of the first, second, third and fourth magnetic poles is a second-phased coil,
a common pin;
a first power pin; and
a second power pin, wherein the first coil layers of the first, second, third and fourth magnetic poles are formed by a first wire, wherein the second coil layers of the first, second, third and fourth magnetic poles are formed by a second wire, wherein the first wire has two ends respectively connected to the common pin and the first power pin, and wherein the second wire has two ends respectively connected to the second power pin and the common pin.

* * * * *